US012299542B2

(12) United States Patent
Butvinik

(10) Patent No.: US 12,299,542 B2
(45) Date of Patent: May 13, 2025

(54) SYSTEMS AND METHODS FOR UNSUPERVISED FEATURE SELECTION FOR ONLINE MACHINE LEARNING

(71) Applicant: Actimize Ltd., Ra'anana (IL)

(72) Inventor: Danny Butvinik, Haifa (IL)

(73) Assignee: Actimize Ltd., Ra'anana (IL)

( * ) Notice: Subject to any disclaimer, the term of this patent is extended or adjusted under 35 U.S.C. 154(b) by 362 days.

(21) Appl. No.: 16/937,783

(22) Filed: Jul. 24, 2020

(65) Prior Publication Data

US 2022/0027780 A1 Jan. 27, 2022

(51) Int. Cl.
*G06N 20/00* (2019.01)
*G06N 3/08* (2023.01)
*G06N 3/088* (2023.01)

(52) U.S. Cl.
CPC .............. *G06N 20/00* (2019.01); *G06N 3/08* (2013.01); *G06N 3/088* (2013.01)

(58) Field of Classification Search
CPC ........... G06N 20/00; G06N 3/08; G06N 3/088
See application file for complete search history.

(56) References Cited

U.S. PATENT DOCUMENTS

| 2017/0091657 | A1* | 3/2017 | Kida | G06N 20/00 |
| 2018/0113773 | A1* | 4/2018 | Krishnan | G06N 20/20 |
| 2018/0211182 | A1* | 7/2018 | Lei | G06N 20/00 |
| 2019/0026430 | A1* | 1/2019 | Grouchy | G06N 20/00 |
| 2019/0205735 | A1* | 7/2019 | Smelyanskiy | G06N 3/08 |
| 2019/0279102 | A1* | 9/2019 | Cataltepe | G06N 3/0445 |
| 2020/0134316 | A1* | 4/2020 | Krishnamurthy | G06V 20/70 |
| 2021/0096241 | A1* | 4/2021 | Bongio Karrman | G06V 10/764 |

OTHER PUBLICATIONS

Noura Al Nuaimi, et al, "Toward Optimal Streaming Feature Selection", 2017, 2017 IEEE International Conference on Data Science and Advanced Analytics (DSAA), All pages (Year: 2017).*

* cited by examiner

*Primary Examiner* — Roberto Borja
(74) *Attorney, Agent, or Firm* — PEARL COHEN ZEDEK LATZER BARATZ LLP

(57) ABSTRACT

Systems and methods for unsupervised feature selection for online machine learning are provided. Features can be selected from a plurality of online data sources having a plurality of respective online data streams, and an aggregated feature set and aggregated data can be formed therefrom. The aggregated feature set and the aggregated data can be used by machine learning models in real time to provide real time online machine learning.

15 Claims, 6 Drawing Sheets

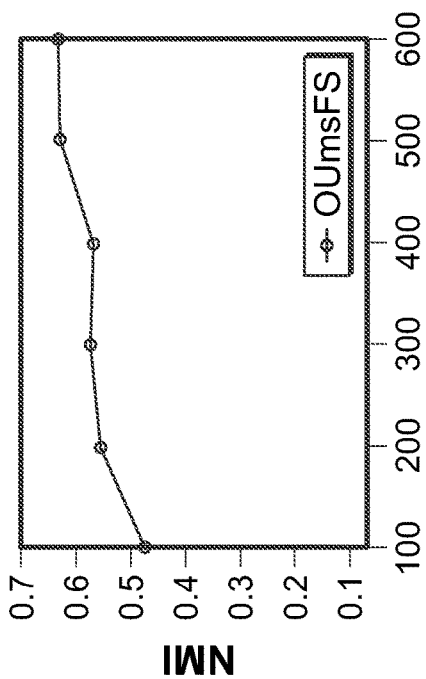
FIG. 4A
(a): Accuracy for Synth-2 data source
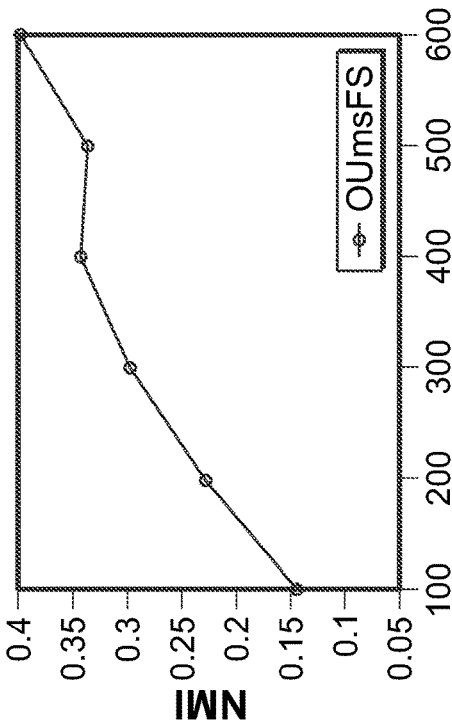
FIG. 4B
(b): NMI for Synth-2 data source
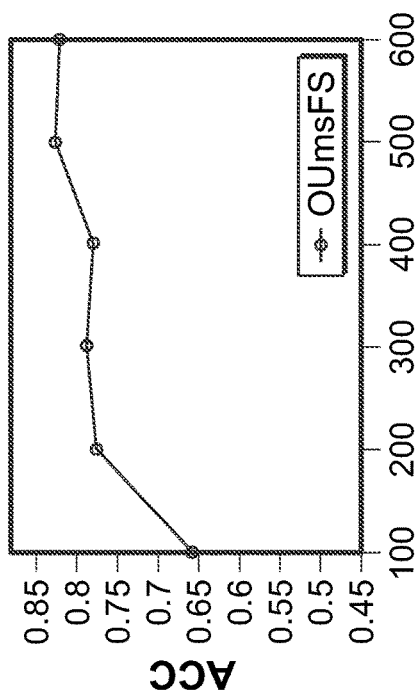
FIG. 4C
(c): Accuracy for Synth-1 data source
FIG. 4D
(d): NMI for Synth-1 data source

SYSTEMS AND METHODS FOR UNSUPERVISED FEATURE SELECTION FOR ONLINE MACHINE LEARNING

FIELD OF THE INVENTION

The invention relates generally relates to technology for online machine learning. In particular, to real time feature selection from streaming online data sources for use in one or more online machine learning models that are created and/or updated in real time.

BACKGROUND OF THE INVENTION

Current technologies include machine learning algorithms which can involve using large amounts of data to create and/or train models that can make determinations and/or predictions. The models can be updated to continue learning. Typically, creating and/or training data is done offline. For example, for machine learning involving banking transactions, banking transaction data can be stored and later used to train one or more models.

In some scenarios, not all data is used for training, but data having certain features is selected so that models can be trained based on the most relevant features for the determinations and/or predictions. For example, in training a model that predicts a person's likelihood to repay a loan, data that indicates a persons birth place is irrelevant in comparison to a persons credit score and net worth.

Models that are trained offline can provide determinations and/or predictions that are out of date. For example, using models that are one year old, 6 months old, or even 1 day old can provide inaccurate determinations and/or outcomes. For example, in financial markets when a war starts, during an earthquake and/or during a pandemic outbreak.

Data used for machine learning can be obtained from multiple data sources. In some scenarios, multiple data sources can provide complementary information for data that is, for example, semantically the same or similar data.

Therefore, it can be desirable to perform online machine learning and train models online from streaming data online. It can also be desirable to perform feature selection online. It can also be desirable to identify and/or eliminate data from multiple data sources that provide redundant and/or substantially similar machine learning inputs.

SUMMARY OF THE INVENTION

One advantage of the invention can include performing online machine learning and train models online from streaming data online. Another advantage of the invention can include improved feature selection for machine learning. Another advantage of the invention can include an ability to perform improved feature selection for unlabeled data. Another advantage of the invention can include a selection of relevant features from online data streams, such that the data can fit within available memory for online machine learning.

Another advantage of the invention can include performing feature selection online.

In one aspect, the invention involves a method for unsupervised feature selection for online machine learning. The method also involves receiving, via a computer, a first online data stream from a first online data source and a second online data stream from a second online data source. The method also involves at a periodic frequency, determining, via the computer, a first set of features based on a portion of the first online data stream, where the portion of the first online data stream changes each period. The method also involves at the periodic frequency, determining, via the computer, a second set of features based on a portion of the second data stream, where the portion of the second data stream changes each period. The method also involves at the periodic frequency, determining, via the computer, an aggregate feature set for updating one or more online machine learning models in real time, such that the one or more one line machine learning models are usable in real time.

In some embodiments, the portion of the first online data stream is based on a size of a buffer in the computer. In some embodiments, the portion of the second online data stream is based on a size of a buffer in the computer. In some embodiments, determining the first set of features is further based on the first set of features determined at a prior period. In some embodiments, determining the second set of features is further based on the second set of features determined at a prior period.

In some embodiments, determining the first set of features is further based on similarity between features of the first online data stream and the second online data stream. In some embodiments, the first online data source includes an online application.

In another aspect, the invention involves a system for unsupervised feature selection for online machine learning. The system includes a plurality of online data sources that each respectively transmit an online data stream. The system also includes a plurality of processors, each in communication with one of the plurality of online data sources. Each of the plurality of processors can be configured to receive an online data stream from the particular online data source the particular processor is in communication with, determine a set of features based on a portion of the received online data stream, determine an aggregate feature set for updating one or more online machine learning models in real time, such that the one or more online machine learning models are usable in real time.

In some embodiments, the portion of the online data stream is based on a size of a buffer in the computer. In some embodiments, determining the set of features is further based on the set of features determined at a prior period. In some embodiments, determining the set of features is further based on similarity between features of the respective online data stream from the plurality of online data sources. In some embodiments, the plurality of online data sources includes online applications.

In another aspect, the invention involves a non-transitory computer readable storage medium storing a set of instructions for causing a computer to unsupervised feature selection for online machine learning, by performing the operations of receiving a first online data stream from a first online data source and a second online data stream from a second online data source. Also performing the operations of at a periodic frequency, determining a first set of features based on a portion of the first online data stream, where the portion of the first online data stream changes each period. Also performing the operations of at the periodic frequency, determining a second set of features based on a portion of the second data stream, where the portion of the second data stream changes each period. Also performing the operations of at the periodic frequency, determining an aggregate feature set for updating one or more online machine learning models in real time, such that the one or more online machine learning models are usable in real time.

BRIEF DESCRIPTION OF THE DRAWINGS

Non-limiting examples of embodiments of the disclosure are described below with reference to figures attached hereto that are listed following this paragraph. Dimensions of features shown in the figures are chosen for convenience and clarity of presentation and are not necessarily shown to scale.

The subject matter regarded as the invention is particularly pointed out and distinctly claimed in the concluding portion of the specification. The invention, however, both as to organization and method of operation, together with objects, features and advantages thereof, can be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

FIGS. 4A-4D are graphs showing accuracy versus number of selected features for embodiments of the invention in comparison to example prior art methods.

It will be appreciated that for simplicity and clarity of illustration, elements shown in the figures have not necessarily been drawn accurately or to scale. For example, the dimensions of some of the elements can be exaggerated relative to other elements for clarity, or several physical components can be included in one functional block or element.

DETAILED DESCRIPTION

In the following detailed description, numerous specific details are set forth in order to provide a thorough understanding of the invention. However, it will be understood by those skilled in the art that the present invention can be practiced without these specific details. In other instances, well-known methods, procedures, and components, modules, units and/or circuits have not been described in detail so as not to obscure the invention.

Figure 1:
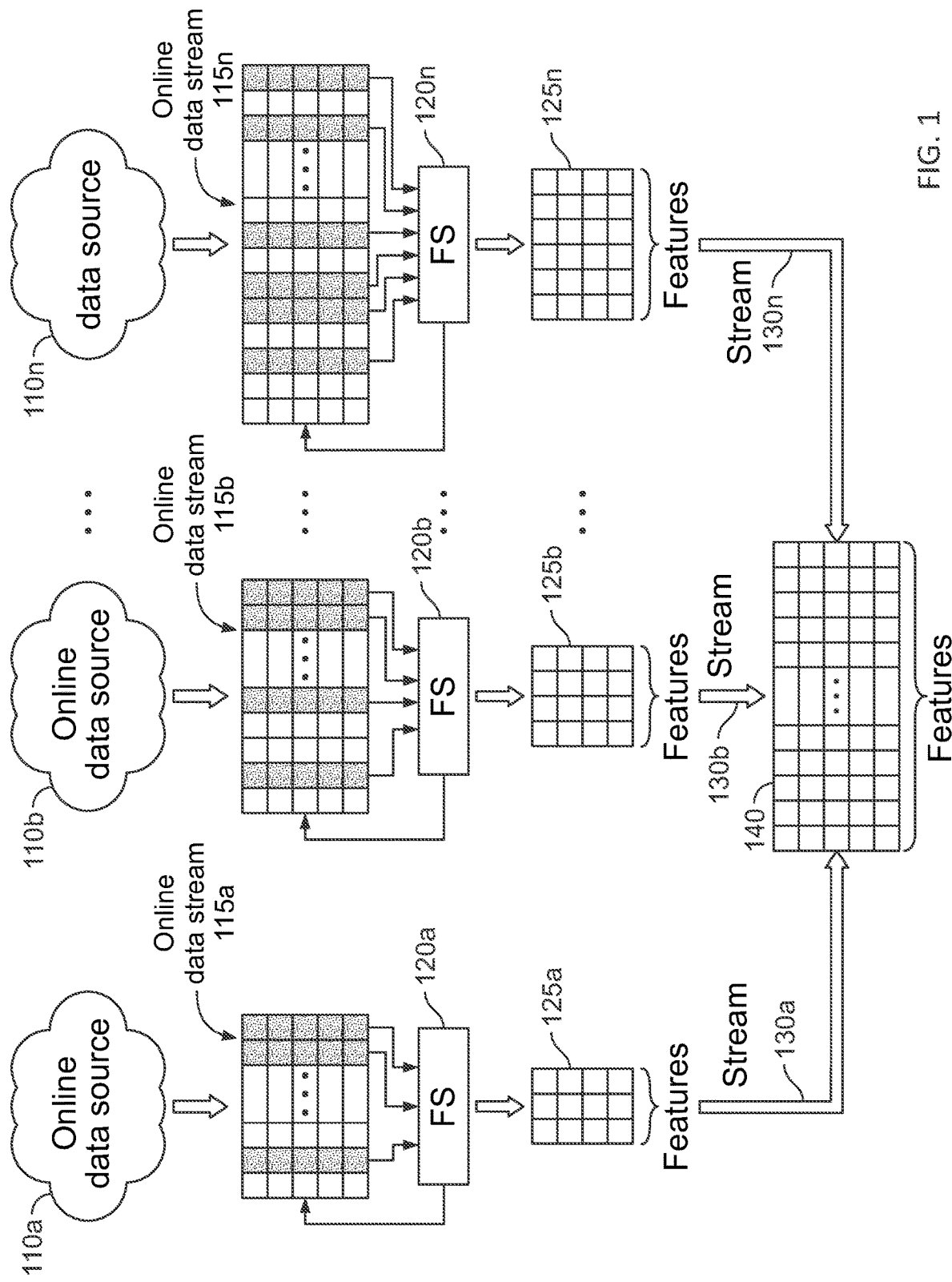
FIG. 1 is a block diagram of a system for unsupervised feature selection for online machine learning, according to an illustrative embodiment of the invention.

FIG. 1 is a block diagram of a system 100 for unsupervised feature selection for online machine learning, according to an illustrative embodiment of the invention. The system 100 includes an online data source 110a, an online data source 110b, . . . an online data source 110n, generally online data sources 110, and a feature selection module 120a, a feature selection module 120b, . . . a feature selection module 120n, generally feature selection modules 120.

The online data sources 110 can each transmit an online data stream, online data stream 115a, online data stream 115b, . . . online data stream 115n, generally online data stream 115. The online data streams can 115 can be input to the respective feature selection module 120a. Each feature selection module 120a can select a portion of its respective online data stream 115 based on respective set of features 125a, 125b, . . . 125n, generally, set of features, 125 that corresponds to each feature selection module 120 (as is discussed in further detail below with respect to FIG. 2). The portion of the online data stream 130a, 130b, . . . 130n, respectively, 130, can be aggregated to form an aggregate data stream having an aggregate feature 140 set that can be used, for example, by online machine learning modules (not shown) to perform machine learning. The aggregate feature set can be formed in one of the feature selection modules 120, and/or in an aggregate module (not shown).

Each respective feature selection module 120 can receive its respective online data stream 115 and apply the feature selection to online data stream 115 in blocks. The size of the block can depend on frequency of transmission of the online data stream from a source of the online data stream, size of the online data stream, processing speed of a computing device that the feature selection module resides on, computer memory size of the computing device that the feature selection module resides on, or any combination thereof.

For example, assume online data streams 115a and 115b each transmit data according to its own bandwidth. The transmitted data can be temporarily stored until predetermined sized are reached prior to transmitting to the feature selection module. For example, the online data streams 115a and 115b can transmit 1 gigabyte of data each. In this example, the feature selection modules 120a and 120b can process a first portion of the online data stream of 0.5 gigabyte, and a second portion of the online data stream of 0.5 gigabyte. The aggregate data stream can be formed two times in this example, once for each 0.5 gigabyte processed.

In various embodiments, the online data sources 110 each reside on their own respective computing devices (e.g., on computing devices connected to the Internet), on the same computing device, or on any combination of computing devices.

In various embodiments, feature selection modules 120 each reside on their own respective computing devices, on the same computing device, or on any combination of computing devices.

In various embodiments, there are any integer number of online data sources 110 and corresponding number of online data streams 115 and feature selection modules 120. In various embodiments, any of the online data sources 110 can output more than one online data stream. In these embodiments, each online data stream output by a single online data source can be input to its own respective feature selection module 120a.

In various embodiments, the online data sources 110/ online data streams are sources/data related to weather forecasting, transportation, stock markets, clinical research, natural disasters, call records, and/or vital-sign monitoring.

In some embodiments, for a data chunk of size having 500,000 rows and 30 columns, the invention can allow feature selection to be performed on the order of 50 milliseconds, in comparison to prior art methods which on the order of 5 seconds.

Figure 2:
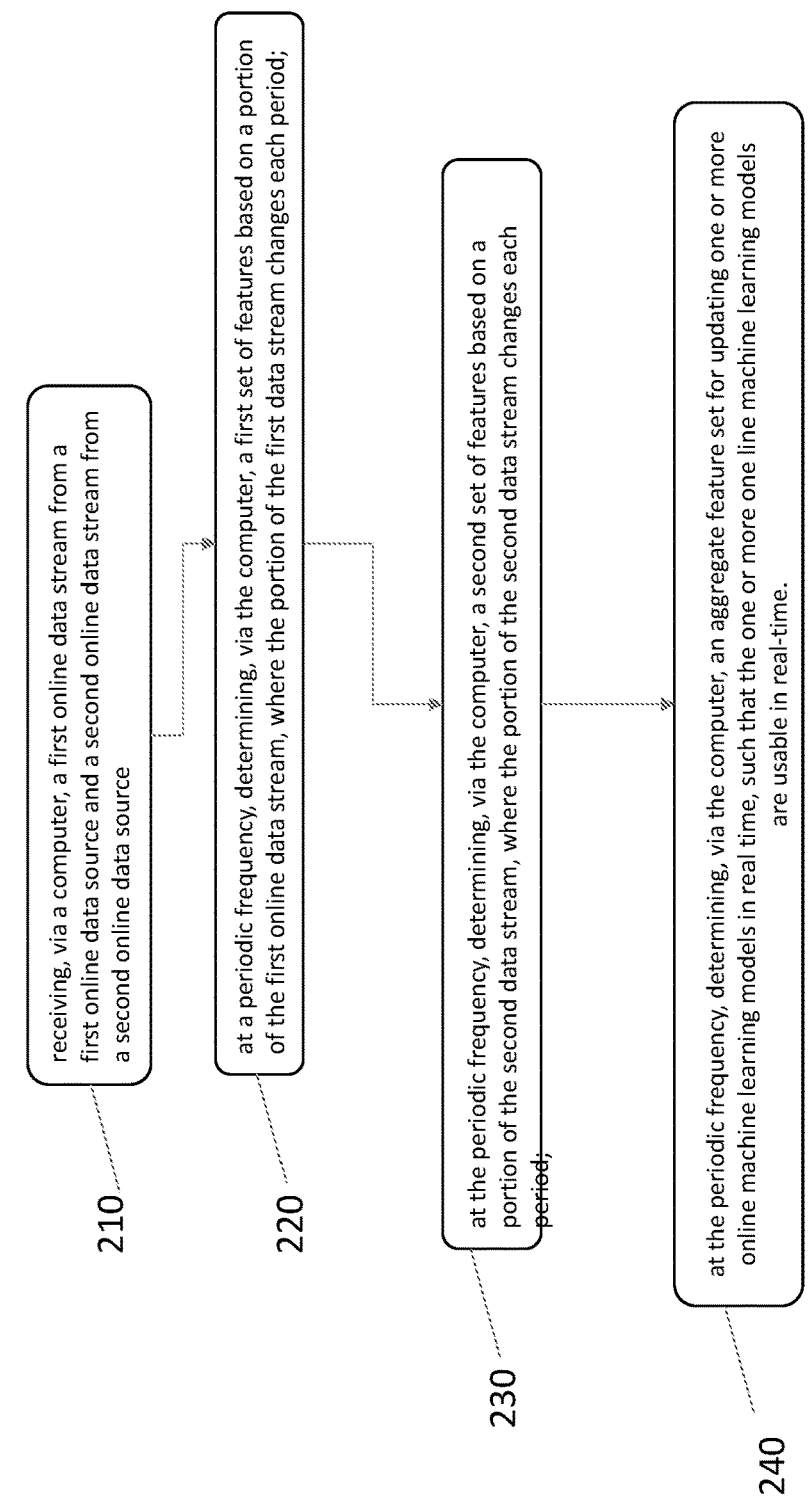
FIG. 2 is a flow diagram for a method for unsupervised feature selection for online machine learning, according to an illustrative embodiment of the invention.

FIG. 2 is a flow diagram for a method for unsupervised feature selection for online machine learning, according to an illustrative embodiment of the invention.

The method involves receiving, via a computer, a first online data stream (e.g., online data stream 115a, as described above in FIG. 1) from a first online data source (e.g., online data source 110a, as described above in FIG. 1) and a second online data stream e.g., online data stream 115b, as described above in FIG. 1) from a second online data source (e.g., online data source 110b, as described above in FIG. 1) (Step 210).

The method also involves at a periodic frequency, determining, via the computer, a first set of features (e.g., via a feature selection module 120a as described above in FIG. 1)

based on a portion of the first online data stream, where the portion of the first online data stream changes each period (Step 220).

The method also involves at the periodic frequency, determining, via a computer, a second set of features (e.g., via a feature selection module 120b as described above in FIG. 1) based on a portion of the second data stream, where the portion of the second data stream changes each period (Step 230).

The method also involves at the periodic frequency, determining, via the computer, an aggregate feature set for updating one or more online machine learning models in real time, such that the one or more online machine learning models are usable in real time (Step 240). In various embodiments, the one or more online machine learning models are classification, regression purposed in XGBoost, Logistic Regression, Isolation Forest, SVM, Supervised Deep Neural Networks with different architectures (CNN, RNN, LSTM).

Figure 3A:
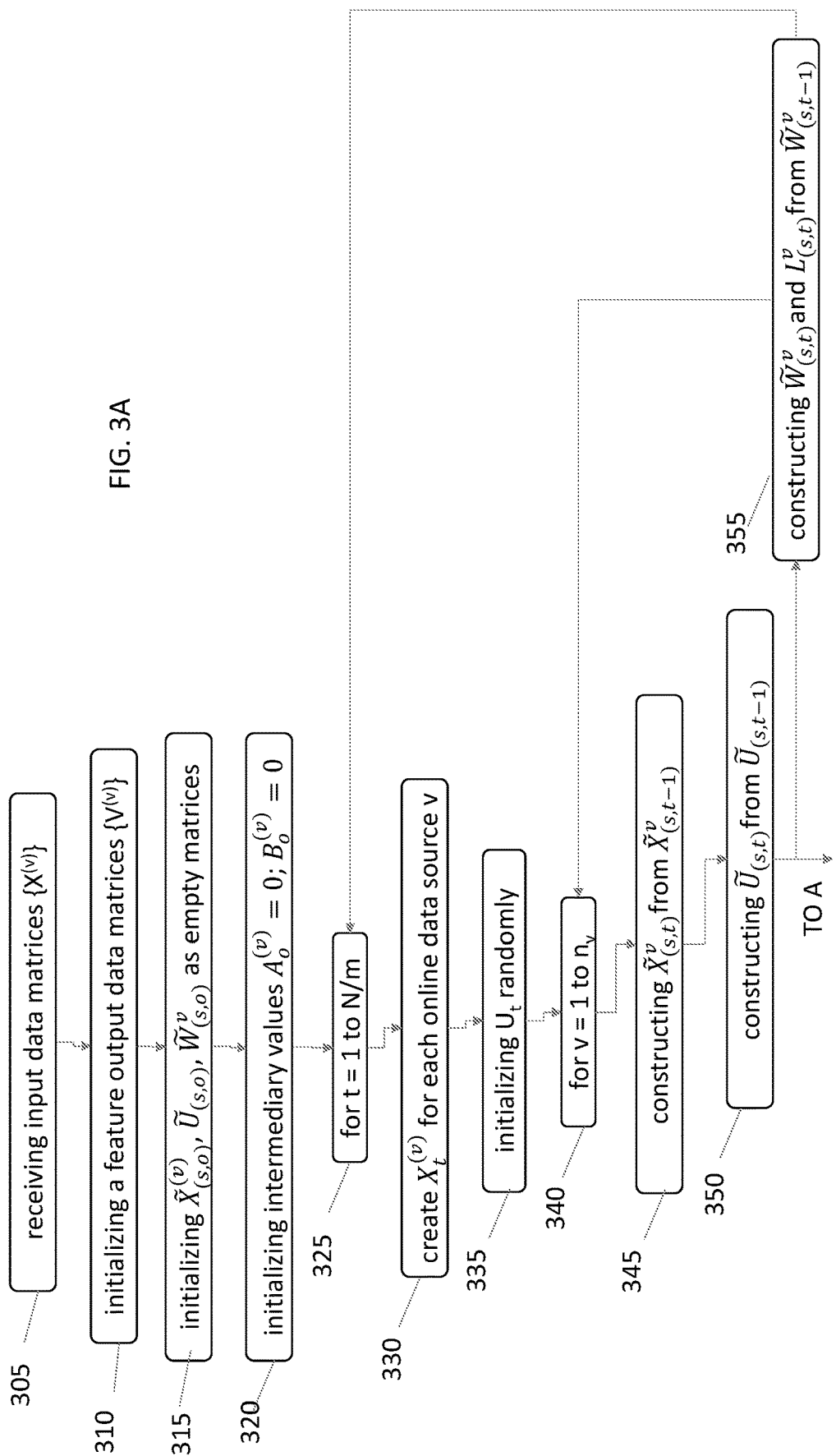
FIGS. 3A and 3B are a flow diagram for a method for unsupervised feature selection for online machine learning, according to an illustrative embodiment of the invention.
Figure 3B:
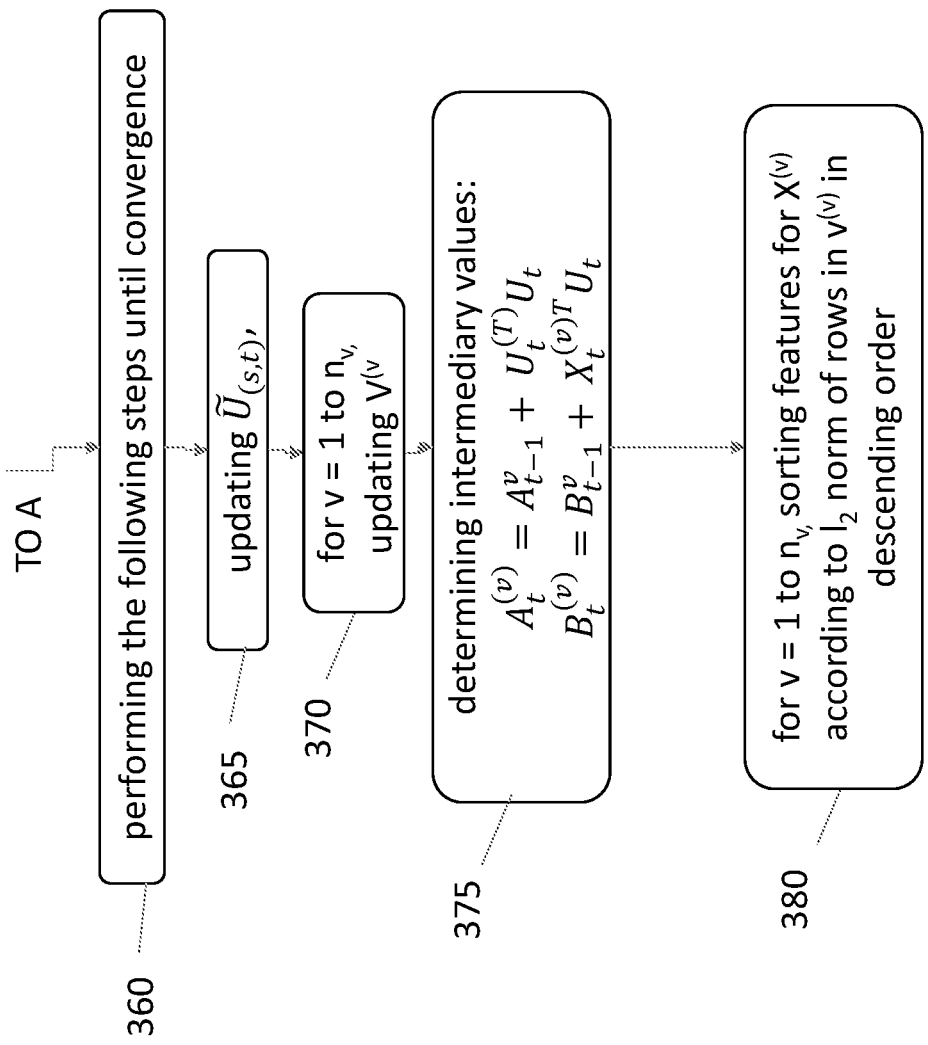

In various embodiments, determining the first set of features, the second set of features and the aggregate set of features can be done as described in FIG. 3A and FIG. 3B. Turning to FIG. 3A and FIG. 3B, FIG. 3A and FIG. 3B are a flow chart of a method for unsupervised feature selection for online machine learning, according to some embodiments of the invention.

The method can involve, receiving input data matrices $\{X^{(v)}\}$, where X is block of data from an online data stream from a particular online data source v (Step 305). For example, a block of data from the first online data stream as referred to in FIG. 2 from the first online data source as referred to in FIG. 1 can be $\{X^{(1)}\}$, a block of data from the second online data stream as referred to in FIG. 2 from the second online data source as referred to in FIG. 1 can be $\{X^{(2)}\}$, and the nth online data stream from the nth online data source can be $\{X^{(n)}\}$, where n is an integer value.

The method can also involve, initializing a feature output data matrices $\{V^{(v)}\}$, where V is a set of features for a corresponding online data stream from a particular online data source v (Step 310). For example, the first set of features for the first online data stream can be $\{V^{(1)}\}$, the second set of features for the second online data stream can be $\{V^{(2)}\}$, and the nth set of features for the nth online data stream can be $\{V^{(n)}\}$, where n is an integer value.

The method can also involve initializing $\tilde{X}_{(s,o)}^{(v)}$, $\tilde{U}_{(s,o)}$, $\tilde{W}_{(s,o)}^{v}$ as empty matrices, where $\tilde{X}_{(s,o)}^{v}$ is a data block from the v-th online data source that is sized to meet memory (e.g., a buffer) of size s dedicated to store the data block, $\tilde{U}_{(s,o)}$ is a cluster matrix indication of size, and $\tilde{W}_{(s,o)}^{v}$ is the similarity matrix that indicates a similarity based on $\tilde{X}_{(s,o)}^{(v)}$ (Step 315).

The method can also involve initializing intermediary values $A_o^{(v)}=0$, $B_o^{(v)}=0$, where v is the particular online data source (Step 320).

The method can also involve for t=1 to N/m (Step 325), where N is a total number of instances (e.g., number of rows) in a block of data of an online data stream of an online data source, and m is a size of the block of data of the online data stream of the online data source, performing the following:

a. create $X_t^{(v)}$ for each online data source v (Step 330);
 b. initializing $U_t$ randomly, where $U_t$ is a cluster matrix of indications per time t (Step 335);
 c. for v=1 to $n_v$ (Step 340), where $n_v$ is a total number of online data sources:
  i. constructing $\tilde{X}_{(s,t)}^{v}$ from $\tilde{X}_{(s,t-1)}$ e.g., constructed as is known in the art) (Step 345), where $\tilde{X}_{(s,t)}^{v}$ is a current data block at time t from the vth online data source sized to meet a buffer of size s dedicated for use by the feature selection module, and $\tilde{X}_{(s,t-1)}$ a prior data block at time t−1 from the vth online data source sized to meet a buffer of size s dedicated for use by the feature selection module;
  ii. constructing $\tilde{U}_{(s,t)}$ from $\tilde{U}_{(s,t-1)}$ (e.g., constructed as is known in the art) (Step 350); and
  iii. constructing $\tilde{W}_{(s,t)}^{v}$ and $L_{(s,t)}^{v}$ from $\tilde{W}_{(s,t-1)}^{v}$ (Step 355), where $\tilde{W}_{(s,t)}^{v}$ is a current similarity matrix at time t, $\tilde{W}_{(s,t-1)}^{(v)}$ is a prior similarity matrix at time t−1, and $L_{(s,t)}^{v}$ is a Lapacian matrix of $\tilde{W}_{(s,t-1)}^{v}$.

The method can also involve performing the following steps until convergence (Step 360), wherein convergence can be determined by satisfying an objective function of $\min\|X-UV^{\wedge}T\|$:

a. updating $\tilde{U}_{(s,t)}$, which can be done as described in detail further below in Eqn. 3 (Step 365);
 b. for v=1 to to $n_v$, where $n_v$ is a total number of online data sources: updating $V^{(v)}$, which can be done as described in detail further below in Eqn. 4 (Step 370).

The method can also involve determining intermediary values (Step 375) as follows:

$$A_t^{(v)} = A_{t-1}^{v} + U_t^{(T)} U_t \quad \text{Eqn. 1}$$

$$B_t^{(v)} = B_{t-1}^{v} + X_t^{(v)T} U_t \quad \text{Eqn. 2}$$

where T is $T_{[t]} = U_{[t]} U_{[k]}^{T} U_{[t]}$, where $A_{t-1}$ is a prior intermediary value at a time t−1, $B_{t-1}^{v}$ is a prior intermediary value at a time t−1, $U_t^{(T)}$ is cluster matrix of indications at the current time, $X_t^{(v)T}$ is a transpose of $X_t^{(v)}$.

The method can also involve for v=1 to $n_v$ (Step 380), where $n_v$ is a total number of online data sources, sorting features for $X^{(v)}$ according to $l_2$ norm of rows in $v^{(v)}$ in descending order, as is known in the art.

In some embodiments, updating $\tilde{U}_{(s,t)}$ is done as follows:

$$(\tilde{U}_{(s,t)})_{i,k} \leftarrow (\tilde{U}_{(s,t)})_{i,k} \sqrt{\frac{\left(\sum_{v=1}^{n_v} \tilde{X}_{(s,t)}^{v} V^{v} + (\lambda \tilde{U}_{(s,t)} + \tilde{M}_{(s,t)}^{-} U_{(s,t)})\right)_{i,k}}{\left(\tilde{U}_{(s,t)} \sum_{v=1}^{n_v} V^{vT} V^{v} + \gamma \tilde{T}_{(s,t)} + \tilde{M}_{(s,t)}^{+} \tilde{U}_{(s,t)}\right)_{i,k}}} \quad \text{Eqn. 3}$$

where $\tilde{M}_{(s,t)}^{v}$ is an aggregated matrix for [1-s+1 ... t] period, $\tilde{W}_{(s,t)}^{v}$ is a similarity matrix for [1-s+1 ... t] period, $V^{(v)}$ is the output feature dataset, is $[V^{(v)}]^T$ is the transpose $V^{(v)}$, where λ controls an orthogonality condition (e.g., λ>0 to ensure orthogonality), where T is [DB] defined as $T_{[t]} = U_{[t]} U_{[k]}^{T} U_{[t]}$, $\tilde{T}_{(s,t)}$ is an aggregated T in period [s,t], i is row indices, and j is column indices.

In some embodiments, updating $V^{(v)}$ is done as follows:

$$V_{j,k}^{v} \leftarrow V_{j,k}^{v} \sqrt{\frac{\left(B_{t-1}^{v} + X_t^{(v)T} U_t\right)_{j,k}}{V^{(v)}\left(A_{t-1} + U_t^T U_t\right) + \frac{1}{2} B_v D^v V^v}} \quad \text{Eqn. 4}$$

where $D^v$ is feature vector dimensionality of a particular online source v, j is row indices, and k is column indices.

FIGS. 4A-4D are graphs showing accuracy versus number of selected features as describes using methods of the invention (e.g., method shown in FIGS. 2 and 3 above).

Figure 5:
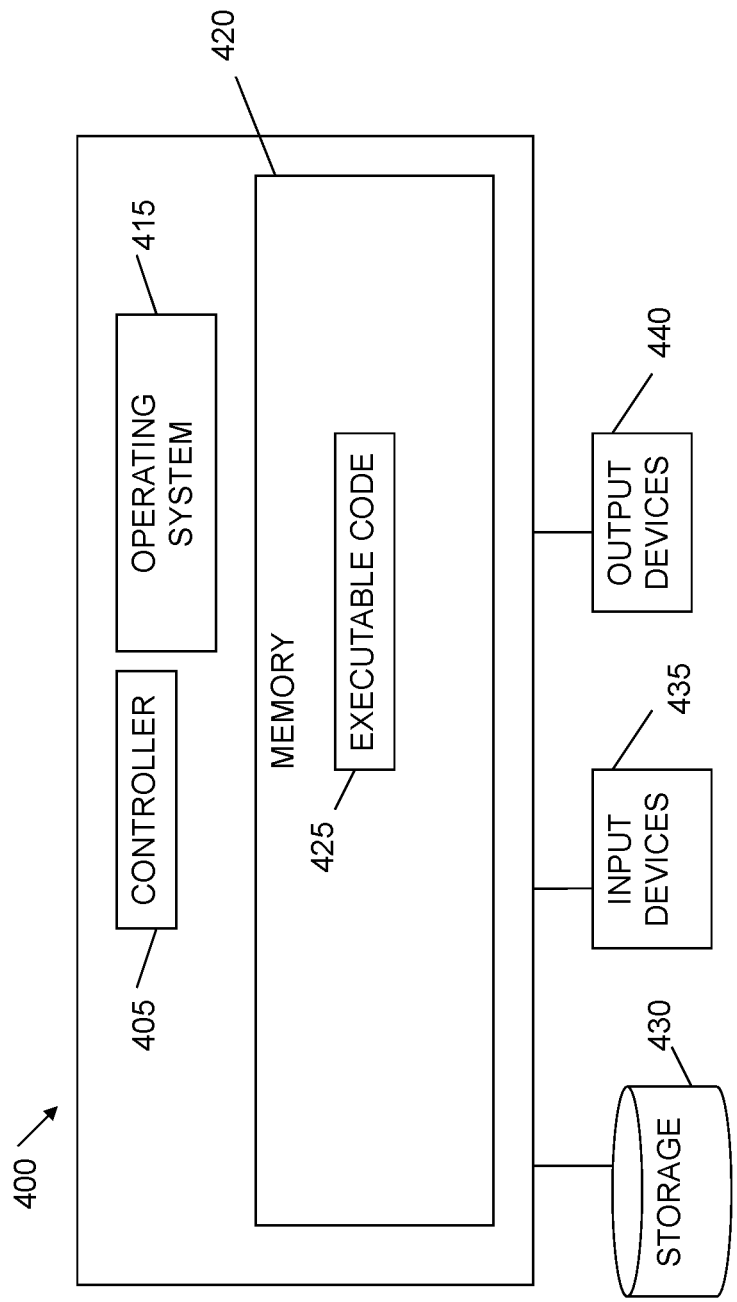
FIG. 5 is a block diagram of a computing device which can be used with embodiments of the invention.

FIG. 5 shows a block diagram of a computing device 400 which can be used with embodiments of the invention. Computing device 400 can include a controller or processor 405 that can be or include, for example, one or more central processing unit processor(s) (CPU), one or more Graphics Processing Unit(s) (GPU or GPGPU), a chip or any suitable computing or computational device, an operating system 415, a memory 420, a storage 430, input devices 435 and output devices 440.

Operating system 415 can be or can include any code segment designed and/or configured to perform tasks involving coordination, scheduling, arbitration, supervising, controlling or otherwise managing operation of computing device 400, for example, scheduling execution of programs. Memory 420 can be or can include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 420 can be or can include a plurality of, possibly different memory units. Memory 420 can store for example, instructions to carry out a method (e.g. code 425), and/or data such as user responses, interruptions, etc.

Executable code 425 can be any executable code, e.g., an application, a program, a process, task or script. Executable code 425 can be executed by controller 405 possibly under control of operating system 415. For example, executable code 425 can when executed cause masking of personally identifiable information (PII), according to embodiments of the invention. In some embodiments, more than one computing device 400 or components of device 400 can be used for multiple functions described herein. For the various modules and functions described herein, one or more computing devices 400 or components of computing device 400 can be used. Devices that include components similar or different to those included in computing device 400 can be used, and can be connected to a network and used as a system. One or more processor(s) 405 can be configured to carry out embodiments of the invention by for example executing software or code. Storage 330 can be or can include, for example, a hard disk drive, a floppy disk drive, a Compact Disk (CD) drive, a CD-Recordable (CD-R) drive, a universal serial bus (USB) device or other suitable removable and/or fixed storage unit. Data such as instructions, code, NN model data, parameters, etc. can be stored in a storage 430 and can be loaded from storage 430 into a memory 420 where it can be processed by controller 405. In some embodiments, some of the components shown in FIG. 4 can be omitted.

Input devices 435 can be or can include for example a mouse, a keyboard, a touch screen or pad or any suitable input device. It will be recognized that any suitable number of input devices can be operatively connected to computing device 400 as shown by block 435. Output devices 440 can include one or more displays, speakers and/or any other suitable output devices. It will be recognized that any suitable number of output devices can be operatively connected to computing device 400 as shown by block 440. Any applicable input/output (I/O) devices can be connected to computing device 400, for example, a wired or wireless network interface card (NIC), a modem, printer or facsimile machine, a universal serial bus (USB) device or external hard drive can be included in input devices 435 and/or output devices 440.

Embodiments of the invention can include one or more article(s) (e.g. memory 420 or storage 430) such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein.

One skilled in the art will realize the invention can be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

In the foregoing detailed description, numerous specific details are set forth in order to provide an understanding of the invention. However, it will be understood by those skilled in the art that the invention can be practiced without these specific details. In other instances, well-known methods, procedures, and components, modules, units and/or circuits have not been described in detail so as not to obscure the invention. Some features or elements described with respect to one embodiment can be combined with features or elements described with respect to other embodiments.

Although embodiments of the invention are not limited in this regard, discussions utilizing terms such as, for example, "processing," "computing," "calculating," "determining," "establishing", "analyzing", "checking", or the like, can refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that can store instructions to perform operations and/or processes.

Although embodiments of the invention are not limited in this regard, the terms "plurality" and "a plurality" as used herein can include, for example, "multiple" or "two or more". The terms "plurality" or "a plurality" can be used throughout the specification to describe two or more components, devices, elements, units, parameters, or the like. The term set when used herein can include one or more items. Unless explicitly stated, the method embodiments described herein are not constrained to a particular order or sequence. Additionally, some of the described method embodiments or elements thereof can occur or be performed simultaneously, at the same point in time, or concurrently.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform functions of the invention by operating on input data and generating output. Method steps can also be performed by an apparatus and can be implemented as special purpose logic circuitry. The circuitry can, for example, be a FPGA (field programmable gate array) and/or an ASIC (application-specific integrated circuit). Modules, subroutines, and software agents can refer to portions of the computer program, the processor, the special circuitry, software, and/or hardware that implement that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer can be operatively coupled to receive data from and/or transfer data to one or more mass storage devices for storing data (e.g., magnetic, magneto-optical disks, or optical disks).

Data transmission and instructions can also occur over a communications network. Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above described techniques can be implemented on a computer having a display device, a transmitting device, and/or a computing device. The display device can be, for example, a cathode ray tube (CRT) and/or a liquid crystal display (LCD) monitor. The interaction with a user can be, for example, a display of information to the user and a keyboard and a pointing device (e.g., a mouse or a trackball) by which the user can provide input to the computer (e.g., interact with a user interface element). Other kinds of devices can be used to provide for interaction with a user. Other devices can be, for example, feedback provided to the user in any form of sensory feedback (e.g., visual feedback, auditory feedback, or tactile feedback). Input from the user can be, for example, received in any form, including acoustic, speech, and/or tactile input.

The computing device can include, for example, a computer, a computer with a browser device, a telephone, an IP phone, a mobile device (e.g., cellular phone, personal digital assistant (PDA) device, laptop computer, electronic mail device), and/or other communication devices. The computing device can be, for example, one or more computer servers. The computer servers can be, for example, part of a server farm. The browser device includes, for example, a computer (e.g., desktop computer, laptop computer, and tablet) with a World Wide Web browser (e.g., Microsoft® Internet Explorer® available from Microsoft Corporation, Chrome available from Google, Mozilla® Firefox available from Mozilla Corporation, Safari available from Apple). The mobile computing device includes, for example, a personal digital assistant (PDA).

Website and/or web pages can be provided, for example, through a network (e.g., Internet) using a web server. The web server can be, for example, a computer with a server module (e.g., Microsoft® Internet Information Services available from Microsoft Corporation, Apache Web Server available from Apache Software Foundation, Apache Tomcat Web Server available from Apache Software Foundation).

The storage module can be, for example, a random access memory (RAM) module, a read only memory (ROM) module, a computer hard drive, a memory card (e.g., universal serial bus (USB) flash drive, a secure digital (SD) flash card), a floppy disk, and/or any other data storage device. Information stored on a storage module can be maintained, for example, in a database (e.g., relational database system, flat database system) and/or any other logical information storage mechanism.

The above-described techniques can be implemented in a distributed computing system that includes a back-end component. The back-end component can, for example, be a data server, a middleware component, and/or an application server. The above described techniques can be implemented in a distributing computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication (e.g., a communication network). Examples of communication networks include a local area network (LAN), a wide area network (WAN), the Internet, wired networks, and/or wireless networks.

The system can include clients and servers. A client and a server are generally remote from each other and typically interact through a communication network. The relationship of client and server arises by virtue of computer programs running on the respective computers and having a client-server relationship to each other.

The above described networks can be implemented in a packet-based network, a circuit-based network, and/or a combination of a packet-based network and a circuit-based network. Packet-based networks can include, for example, the Internet, a carrier internet protocol (IP) network (e.g., local area network (LAN), wide area network (WAN), campus area network (CAN), metropolitan area network (MAN), home area network (HAN), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network (e.g., RAN, Bluetooth®, code-division multiple access (CDMA) network, time division multiple access (TDMA) network, global system for mobile communications (GSM) network), and/or other circuit-based networks.

Some embodiments of the present invention may be embodied in the form of a system, a method or a computer program product. Similarly, some embodiments may be embodied as hardware, software or a combination of both. Some embodiments may be embodied as a computer program product saved on one or more non-transitory computer readable medium (or media) in the form of computer readable program code embodied thereon. Such non-transitory computer readable medium may include instructions that when executed cause a processor to execute method steps in accordance with embodiments. In some embodiments the instructions stores on the computer readable medium may be in the form of an installed application and in the form of an installation package.

Such instructions may be, for example, loaded by one or more processors and get executed. For example, the computer readable medium may be a non-transitory computer readable storage medium. A non-transitory computer readable storage medium may be, for example, an electronic, optical, magnetic, electromagnetic, infrared, or semiconductor system, apparatus, or device, or any combination thereof.

Computer program code may be written in any suitable programming language. The program code may execute on a single computer system, or on a plurality of computer systems.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

In the foregoing detailed description, numerous specific details are set forth in order to provide an understanding of the invention. However, it will be understood by those skilled in the art that the invention can be practiced without these specific details. In other instances, well-known methods, procedures, and components, modules, units and/or circuits have not been described in detail so as not to obscure the invention. Some features or elements described with respect to one embodiment can be combined with features or elements described with respect to other embodiments.

What is claimed is:

1. A method for unsupervised feature selection for online machine learning, the method comprising:
    receiving, via a computer, a first online data stream from a first online data source and a second online data stream from a second online data source;
    at a periodic frequency, determining, via the computer, a first set of features based on a portion of the first online data stream, where the portion of the first online data stream changes each period, and wherein the first set of features is based on a plurality of data blocks, created from the first online data stream where each data block is sized to meet an available physical memory buffer size of the computer;
    at the periodic frequency, determining, via the computer, a second set of features based on a portion of the second data stream, where the portion of the second data stream changes each period and wherein the second set of features is based on a plurality of data blocks, created from the second online data stream where each data block is sized to meet the available physical memory buffer size of the computer; and
    at the periodic frequency, determining, via the computer, an aggregate feature set for updating one or more online machine learning models in real time based on the first set of features, the second set of features, a plurality of cluster matrices of indications one for each of the plurality of data blocks, and a convergence to satisfy an objective function, wherein the objective function is based on the first online data source and the second online data source, such that the one or more online machine learning models are usable in real time,
    wherein determining the first set of features is based on similarity between features of the first online data stream and the second online data stream, and wherein the similarity is determined based on a current similarity matrix at time t, and a prior similarity matrix at time t−1.

2. The method of claim 1 wherein the portion of the first online data stream is based on a size of a buffer in the computer.

3. The method of claim 1 wherein the portion of the second online data stream is based on a size of a buffer in the computer.

4. The method of claim 1 wherein determining the first set of features is further based on the first set of features determined at a prior period.

5. The method of claim 1 wherein determining the second set of features is further based on the second set of features determined at a prior period.

6. The method of claim 1 wherein the first online data source includes an online application.

7. A system for unsupervised feature selection for online machine learning, the system comprising:
    a plurality of online data sources that each respectively transmit an online data stream, wherein the plurality of online data sources include a first online data source and a second online data source;
    a plurality of processors, each in communication with one of the plurality of online data sources, each configured to:
    receive the plurality online data stream from the particular online data source the particular processor is in communication with, including a first online data stream from the first online data source and a second online data stream from the second online data source;
    determine a first set of features and a second set of features based on a portion of the received online data streams,
    wherein the received online data streams include the first online data stream and the second online data stream,
    wherein the first set of features is based a plurality of data blocks created from the first online data stream where each data block is sized to meet an available physical buffer memory size of the processor, and
    wherein the second set of features is based a plurality of data blocks created from the first online data stream where each data block is sized to meet an available physical buffer memory size of the processor; and
    determine an aggregate feature set for updating one or more online machine learning models in real time based on the first set of features, the second set of features, a plurality of cluster matrices of indications one for each of the plurality of data blocks, and a convergence to satisfy an objective function, wherein the objective function is based on the first online data source and the second online data source, such that the one or more online machine learning models are usable in real time,
    wherein determining the set of features is further based on similarity between features of, the first online data stream and the second online data stream, and wherein the similarity is determined based on a current similarity matrix at time t, and a prior similarity matrix at time t−1.

8. The system of claim 7 wherein the portion of the online data stream is based on a size of a buffer in the computer.

9. The system of claim 7 wherein the plurality of online data sources includes online applications.

10. A non-transitory computer readable storage medium storing a set of instructions for causing a computer to perform unsupervised feature selection for online machine learning, by performing the operations of:
    receiving a first online data stream from a first online data source and a second online data stream from a second online data source;
    at a periodic frequency, determining a first set of features based on a portion of the first online data stream, where the portion of the first online data stream changes each period, and wherein the first set of features is based on a plurality of data blocks created from the first online data stream where each data block is sized to meet an available physical buffer memory size of the computer;

at the periodic frequency, determining a second set of features based on a portion of the second data stream, where the portion of the second data stream changes each period and wherein the second set of features is based on a plurality of data blocks created from the first online data stream where each data block is sized to meet an available physical buffer memory size of the computer; and at the periodic frequency, determining an aggregate feature set for updating one or more online machine learning models in real time based on the first set of f, the second set of features, a plurality of cluster matrices of indications one for each of the plurality of data blocks, and a convergence to satisfy an objective function, wherein the objective function is based on the first online data source and the second online data source, such that the one or more online machine learning models are usable in real time, wherein determining the first set of features is further based on similarity between features of the first online data stream and the second online data stream and wherein the similarity is determined based on a current similarity matrix at time t, and a prior similarity matrix at time t−1.

11. The non-transitory computer readable storage medium of claim 10 wherein the portion of the first online data stream is based on a size of a buffer in the computer.

12. The non-transitory computer readable storage medium of claim 10 wherein the portion of the second online data stream is based on a size of a buffer in the computer.

13. The non-transitory computer readable storage medium of claim 10 wherein determining the first set of features is further based on the first set of features determined at a prior period.

14. The non-transitory computer readable storage medium of claim 10 wherein determining the second set of features is further based on the second set of features determined at a prior period.

15. The non-transitory computer readable storage medium of claim 10 wherein the first online data source includes an online application.

* * * * *